United States Patent [19]

Kimball et al.

[11] Patent Number: 5,587,966
[45] Date of Patent: Dec. 24, 1996

[54] SONIC WELL LOGGING METHODS AND APPARATUS FOR PROCESSING FLEXURAL WAVE IN OPTIMAL FREQUENCY BAND

[75] Inventors: Christopher V. Kimball, West Redding, Conn.; David J. Scheibner, Tokyo, Japan

[73] Assignee: Schlumberger Technology Corporation, Ridgefield, Conn.

[21] Appl. No.: 322,885

[22] Filed: Oct. 13, 1994

[51] Int. Cl.⁶ .............................. G01V 1/40; G06F 15/48
[52] U.S. Cl. ................... 367/31; 367/28; 367/32; 364/422
[58] Field of Search ................... 367/28, 31, 32, 367/57; 364/422

[56] References Cited

U.S. PATENT DOCUMENTS

| | | | |
|---|---|---|---|
| 4,698,792 | 10/1987 | Kurkjian et al. | 367/32 |
| 4,703,460 | 10/1987 | Kurkjian et al. | 367/31 |
| 5,077,697 | 12/1991 | Chang | 367/31 |

OTHER PUBLICATIONS

Schmitt et al, J. Acoust. Soc. Americ., vol. 84, #6, pp. 2215–2229, Dec. 1988: abst. only provided herewith.
Lui et al, 61st Annu. SEG Int. Mfg, Nov. 10, 1991, vol. 2, pp. 842–845, AN–518136; abst only herewith.
Lui et al, 63rd Annu SEG Int. Mfg, Sep. 26, 1993, pp. 65–67, AN–561620; abst. only herewith.
Randall, C. J., J. Acoust. Soc. America., vol. 89, #3, pp. 1002–1016, Mar. 1991; abst. only herewith.

*Primary Examiner*—Nelson Moskowitz
*Attorney, Agent, or Firm*—David P. Gordon; Brigitte L. Jeffery; Keith G. W. Smith

[57] ABSTRACT

Methods for determining an optimal frequency band for processing of flexural waves according to bias-corrected STC or QSTC are disclosed. A preliminary estimate of the formation shear slowness S and a determination of the borehole diameter D are first obtained, and the flexural waves are processed in a frequency band having a center frequency $f_c$ which is a function of preliminary estimate of S and the product of that estimate of S and diameter D. Where the preliminary estimate of S indicates a slow formation, $f_c$ is chosen as 0.6/SD. Where the estimate indicates a fast formation, $f_c$ is chosen as 0.2/SD. In other or all formations, a smooth function such as $[0.2+((0.8/\pi) \arctan((S-100)/100))/SD]$ can be used to choose the center frequency. Alternatively, if errors in the environmental parameters can be estimated statistically, they can be used to select an optimum center frequency. Once $f_c$ is chosen, the filter parameters which define the bandwidth of the filter used in the Fourier transform of QSTC and in bias-corrected STC are preferably normalized by scaling the bandwidth BW to a specified fraction of $f_c$; $BW=f_c/Q$. Similarly, the window length $T_w$ used in semblance processing is preferably normalized to scale with $f_c$ so that the processing window contains the same number of cycles regardless of the frequency of the center frequency.

21 Claims, 9 Drawing Sheets

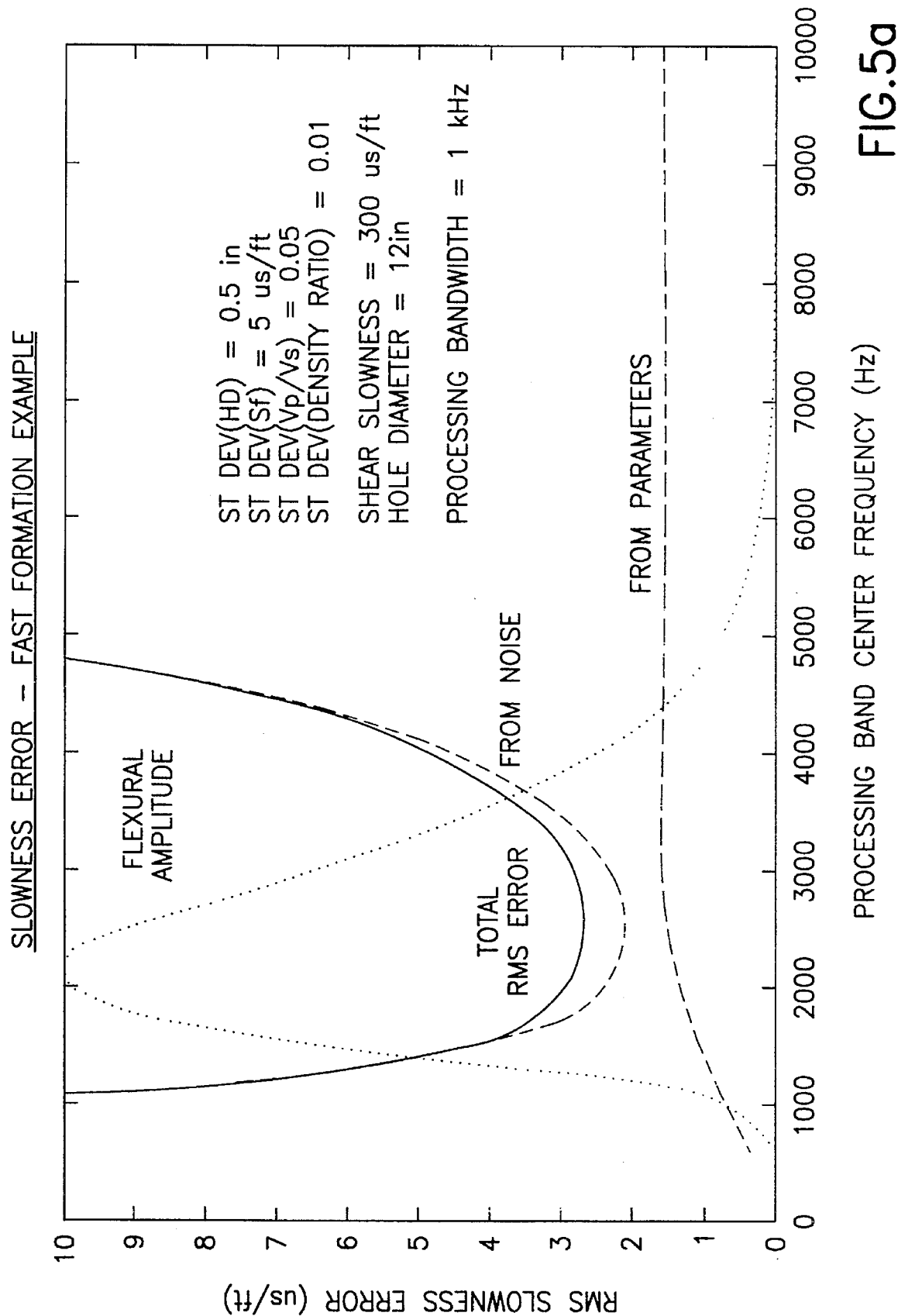

SONIC WELL LOGGING METHODS AND APPARATUS FOR PROCESSING FLEXURAL WAVE IN OPTIMAL FREQUENCY BAND

BACKGROUND OF THE INVENTION

This invention relates generally to sonic well logging. More particularly, this invention relates to sonic well logging techniques useful in quantifying subsurface parameters which are helpful in searching for and exploiting hydrocarbons and other valuable resources. The invention has particular application to determining the shear slowness of formations via utilization and processing of flexural dispersive wave information.

Sonic well logs are typically derived from tools suspended in a mud-filled borehole by a cable. The tools typically include a sonic source (transmitter) and a plurality (m) of receivers which are spaced apart by several inches or feet. Typically, a sonic signal is transmitted from one longitudinal end of the tool and received at the other, and measurements are made every few inches as the tool is slowly drawn up the borehole. The sonic signal from the transmitter or source enters the formation adjacent the borehole, and the arrival times and perhaps other characteristics of the received responses are used to find formation parameters. In most formations, the sonic speeds in the tool and in the drilling mud are less than in the formation. In this situation, the compressional (P-wave), shear (S-wave) and Stoneley arrivals and waves are detected by the receivers and are processed. Sometimes, the sonic speed in the formation is slower than the drilling mud; i.e., the formation is a "slow" formation. In this situation, there is no refraction path available for the shear waves, and the shear waves are typically not measurable at the receivers. However, the shear slowness of the formation is still a desirable formation parameter to obtain. As will be discussed below, the flexural borehole mode has been recognized as an effective method of measuring shear slowness in "slow" formations.

One sonic log of the art which has proved to be useful is the slowness-time coherence (STC) log. Details of the techniques utilized in producing an STC log are described in U.S. Pat. No. 4,594,691 to Kimball et al., as well as in Kimball, et al., "Semblance Processing of Borehole Acoustic Array Data"; *Geophysics*, Vol. 49, No. 3, (March 1984) pp. 274–281 which are hereby incorporated by reference in their entireties herein. Briefly, the slowness-time coherence log utilizes the compressional, shear, and Stoneley waves detected by the receivers. A set of time windows is applied to the received waveforms with the window positions determined by two parameters: the assumed arrival time at the first receiver, and an assumed slowness. For a range of values of arrival time and slowness, a scalar semblance is computed for the windowed waveform segments by backpropagating and stacking the waveforms and taking the ratio of the stacked energies to the unstacked energies. The semblance may be plotted as a contour plot with slowness and arrival times as axes, with maximum semblance values indicating the determined formation slowness value. In addition, local maxima of the semblance function are identified by a peak-finding algorithm, and the corresponding slowness values may be plotted as gray-scale marks on a graph whose axes are slowness and borehole depth. The intensity of the gray-scale marks is proportional to the height of the semblance peak.

As indicated in the aforementioned article and U.S. Pat. No. 4,594,691 to Kimball et al., the same backpropagation and stacking techniques are used regardless of whether the wave being analyzed is a P-wave, S-wave, or a Stoneley wave; i.e., regardless of whether the wave is non-dispersive or dispersive. However, while such backpropagation and stacking techniques may be optimal for non-dispersive waves, they are not optimal for dispersive waves. In response to this problem, at least two different approaches have been utilized.

A first approach known as "bias-corrected STC" which is currently commercial, is disclosed in A. R. Harrison, et al., "Acquisition and Analysis of Sonic Waveforms from a Borehole Monopole and Dipole Source . . . ", SPE 20557, pp. 267–282 (Society of Petroleum Engineers, Inc. 1990) and U.S. Pat. No. 5,229,939 which are both hereby incorporated by reference herein in their entireties, is to process the flexural waveform as before, but to correct the non-dispersive processing results by a factor relating to the measured slowness; i.e., to post-process the STC results. In particular, correction values are obtained by processing model waveforms with the STC techniques and comparing the measured slowness with the formation shear slowness of the model. The model waveforms assume a particular source and are bandlimited to a prescribed band (typically 1 to 3 KHz) before STC processing. Tables of slowness corrections are designated by a particular source and processing bandwidth, and contain corrections as percentage-of-measured-value factors functions of measured value and hole diameter. The percentage correction required increases with hole diameter and is a function of formation slowness, and ranges from less than one percent to as much as fifteen percent. This approach has the drawback that the waveform spectra often disagree with those of the model which causes the precalculated correction to be in error, leading to an error in the measured slowness. A second drawback of the bias-corrected STC approach is that the analysis band may exclude the majority of the flexural mode energy even though it reduces sensitivity to environmental parameters.

A second approach known as "QSTC" (also now known as "dispersive STC" or "DSTC"), which is also currently commercial, is described in U.S. Pat. No. 5,278,805 which is hereby incorporated by reference herein in its entirety. In QSTC, detected signals resulting from flexural waves are Fourier transformed in a specified frequency band, and the Fourier transformed signals are backpropagated according to equations using different dispersion curves. The backpropagated signals are then stacked, and semblances are found in order to choose the dispersion curve of maximum semblance from which can be found the shear slowness of the formation. According to preferred aspects of the QSTC processing, prior to Fourier transforming, the signals are windowed according to a previous estimate of slowness, where the time position of the window is found from maximizing either energy or semblance. The reduced set of data in the window are then extracted for Fourier transformation, and prior to backpropagation, are corrected for the window slowness estimate to prepare them for backpropagation and stacking.

While STC, bias-corrected STC, and QSTC logs all provide valuable information, they are subject to different types of error. For example, as described above, STC processing does not account for, and hence is not optimal for dispersive waves such as flexural waves. In fact, because processing may occur in a frequency band near the low frequency limit, the signal to noise (S/N) ratio may be low, as little energy propagates in that band. Bias-corrected STC, while attempting to account for dispersion, is subject to error because the waveform spectra often disagree with the model, and because the model waveforms are bandlimited to a particular prescribed band in which there may be limited flexural mode energy. Furthermore, bias-corrected STC and QSTC are both subject to errors in the processing of a dispersive wave which arise from errors in the waveforms (i.e., S/N error) as well as errors in formation and borehole parameters (e.g., hole diameter) required in the processing of the dispersive wave information. For purposes herein, the sum of the noise (S/N) error and parameter error is denoted as "total error".

SUMMARY OF THE INVENTION

It is therefore an object of the invention to provide methods of minimizing total error in flexural wave processing.

It is another object of the invention to provide methods for selecting optimal frequency bands for the processing of flexural wave information.

It is a further object of the invention to choose a frequency band for flexural wave processing based on estimates of formation parameters.

It is an additional object of the invention to use a shear slowness estimate and an estimate of hole diameter in order to determine the amplitude peak of the flexural wave.

In accord with the objects of the invention, a method for finding a frequency band for processing flexural waves broadly comprises obtaining a preliminary estimate of the formation shear slowness S, obtaining a determination of the borehole diameter D, and processing the flexural waves in a frequency band with a center frequency which is a function of preliminary estimate of the shear slowness and the product of that estimate of shear slowness and the borehole diameter. Typically, the estimate of shear slowness is obtained via STC, bias-corrected STC, or QSTC processing. In accord with one embodiment of the invention, where the formation is a slow formation, the center frequency of the processing band is chosen as substantially equal to 0.6/SD, while where the formation is a fast formation, the center frequency is chosen as substantially equal to 0.2/SD. In other formations the center frequency of the processing band typically will have a center frequency between 0.2/SD and 0.6/SD, and according to another embodiment of the invention is determined according to $[0.2+((0.8/\pi) \arctan ((S-100)/100))/SD]$. Regardless of the exact center frequency chosen, the flexural waves are processed via QSTC or bias-corrected STC processing to provide a new determination of formation slowness. If desired, that new determination can be used in an iterative manner, with new center frequencies and hence improved shear slownesses being determined.

According to alternative aspect of the invention, the processing band can be chosen by estimating or finding the error of a plurality of formation and/or borehole parameters as a function of frequency, finding or estimating the S/N ratio of the flexural wave signal as a function of frequency, finding in different frequency bands the total error as a function of frequency, and choosing an frequency band of minimum total error in which to process the flexural wave data. The plurality of formation and/or borehole parameters of primary import are the hole diameter error, and the fluid slowness error. Other parameters of interest are the compressional slowness error, and formation/fluid density ratio error.

Regardless of the specific manner of finding the frequency band in which the flexural wave information is to be processed, once the center frequency of the band is chosen, the filter parameters which define the bandwidth of the filter used in the Fourier transform of QSTC and in bias-corrected STC are preferably normalized. Normalization is achieved by scaling the bandwidth to a specified fraction of the center frequency $f_c$ (i.e., $BW=f_c/Q$), so that although the center frequency might change due to formation slowness or hole diameter, the shape of the signals processed will be the same for all values of $f_c$. Similarly, the window length $T_w$ used in STC, bias-corrected STC, and QSTC processing is normalized to scale with the center frequency $f_c$ so that the processing window contains the same number of cycles regardless of the frequency of the center frequency.

Additional objects and advantages of the invention will become apparent to those skilled in the art upon reference to the detailed description in conjunction with the accompanying drawings.

BRIEF DESCRIPTION OF THE DRAWINGS

FIG. 5a is a plot of parameter error, noise error, and total error in the processing of flexural wave information as a function of slowness error and processing band center frequency in a slow formation.

DETAILED DESCRIPTION OF THE PREFERRED EMBODIMENTS

Figure 1:
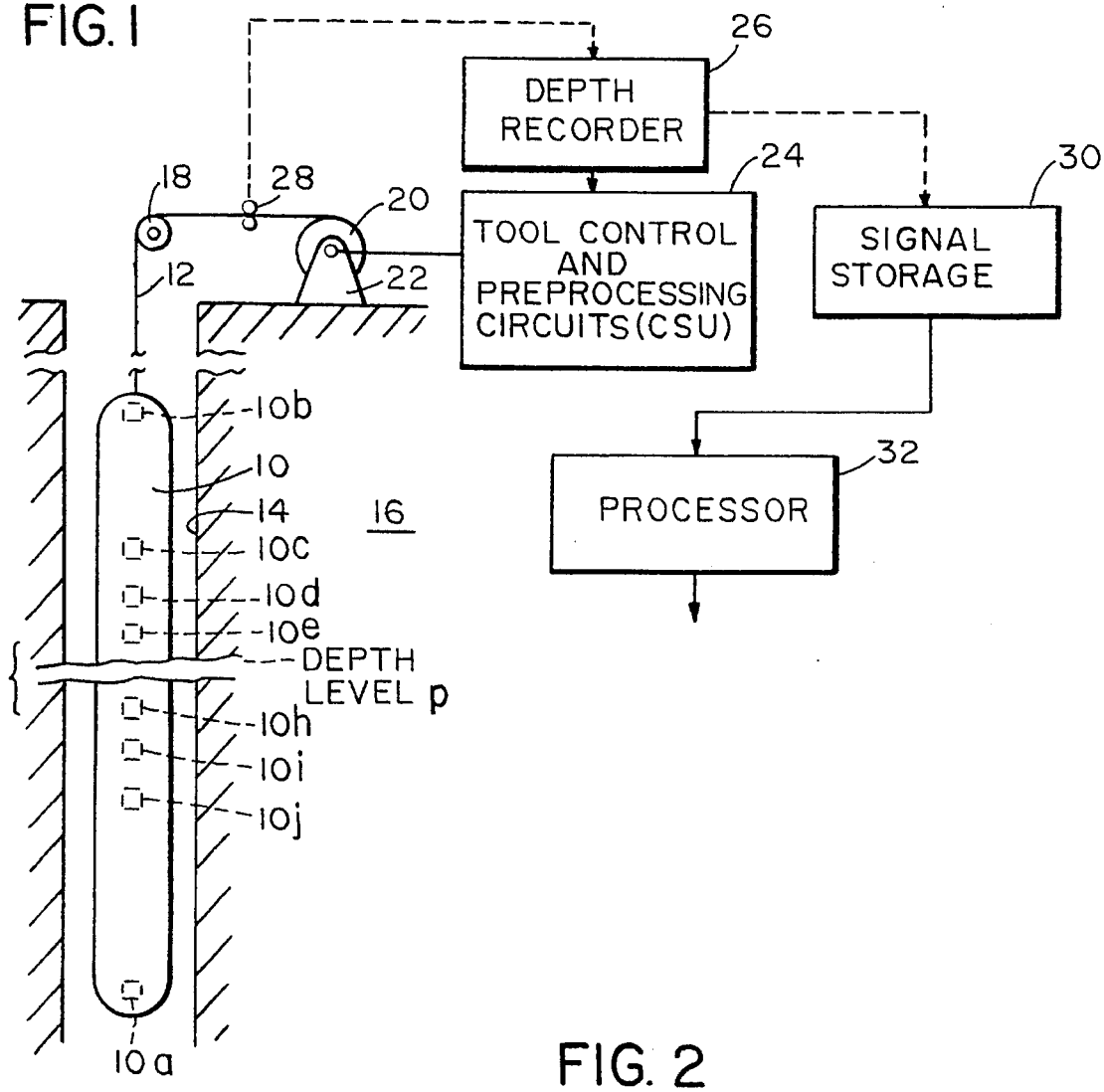
FIG. 1 is an overall schematic illustration of a logging system making use of an exemplary embodiment of the invention.
Figure 2:
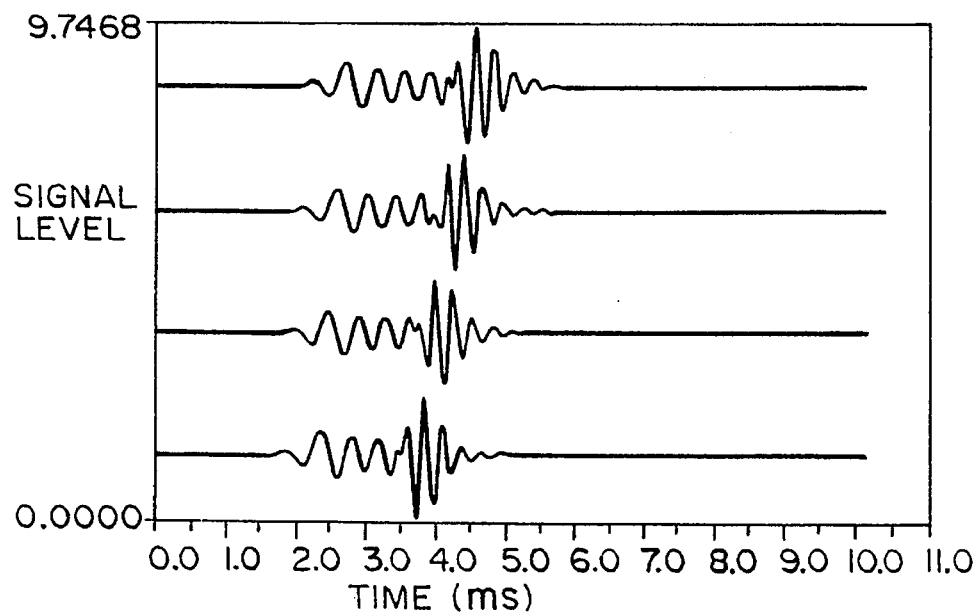
FIG. 2 illustrates waveforms of sonic signals received at a set of sonic receivers spaced from each other along the length of a sonic tool and from a transmitter carried by the same tool.

Referring to FIG. 1, an overall schematic illustration of a well logging system making use of the invention is seen. A sonic tool 10 is shown lowered on an armored multiconductor cable 12 into a borehole 14 (cased or otherwise) to take sonic logs of a subsurface formation 16. Tool 10 is provided with at least one sonic flexural wave source or transmitter 10a (typically dipole), and a plurality (m) of sonic receivers (typically dipole). In FIG. 1, tool 10 is shown with two transmitters 10a and 10b, and eight receivers (m=8) 10c through 10j, it being appreciated that this is by way of example only and not intended to be limiting. The receivers are spaced along the length of tool 10 from each other and from the transmitter(s), and typically the distance between each transmitter and the receiver closest thereto is much greater than the inter-receiver distance. For example, the distance between the transmitter and the receiver nearest thereto is typically in the range of 5–25 feet, and the inter-receiver distance is typically less than half a wavelength of the sonic signal from the transmitter; e.g., about a half a foot to a foot. Tool 10 is adapted from movement up and down borehole 14, and as the tool 10 is moved, the transmitter 10a periodically generates a sonic signal. The generated sonic signal travels through the borehole and/or through the formation, and the receivers typically detect some energy which results from the generated signal. The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between transmitter 10a (and 10b) and receivers 10c through 10i on the one hand, and the surface equipment on the other hand, is made through suitable multi-element slipping and brush contact assembly 22 associated with the drum and winch mechanism 20. A unit 24 contains tool control and pre-processing circuits which send electrical signals to tool 10 and receive other electrical signals (sonic logs) therefrom via cable 12 and assembly 22. Unit 24 cooperates with depth recorder 26 which derives depth level signals from depth measuring wheel 28 so as to associate the signals from receiver 10c through 10n with respective depth levels z in borehole 14. The outputs of sonic receivers 10c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10j in analog form but more typically stores them in the form of digital sonic log measurements, a set for each respective depth level z, derived by digitizing such analog signals, for example in unit 24. Storage 30 can comprise a magnetic storage device such as a disk or tape, and/or other storage media such as semiconductor or equivalent memory circuits. In the case of tool 10 having eight receivers, eight respective waveforms of five hundred twelve digitized measurements each can be produced for every six inches of borehole, which translates to many millions of digitized log measurements for the typical borehole which is several thousands feet deep. Thus storage 30 should preferably have the capacity appropriate for the task. The processing of the digitized log measurements is then accomplished by a computer or processor 32 which processes the information according to the techniques set forth below with reference to FIGS. 6 and 7. The output of the processing is preferably a log of formation slowness versus formation depth z as described in previously incorporated U.S. Pat. No. 5,278,805. In addition, maps of semblance values as a function of slowness and time at particular depths may also be output. The response of any given one of receivers 10c through 10j to a sonic signal from transmitter 10a (or 10b) is typically a waveform of the general type illustrated in FIG. 2. As seen in FIG. 2, the responses of the several receivers are staggered in time due to the different spacing of the receivers from the transmitter. It will be appreciated that where the sonic signal detected is non-dispersive (e.g., P-waves and S-waves), the signal shape obtained at each receiver will take the same or similar form. However, where the sonic signal is dispersive (e.g., flexural waves), the signal changes shape as it traverses the receiver array. Thus, the waveforms shown in FIG. 2 are illustrative of a dispersive wave. As discussed in more detail hereinafter, the waves of interest in the present invention are the dispersive flexural waves.

Before turning to the method of the invention, an understanding of the theoretical basis of the method is instructive. For purposes of simplicity, an isolated flexural wave is assumed, although in practice, other waves will be present in the borehole. The contribution of the other waves can be reduced by tool design; e.g., through the use of differential hydrophone receivers or by processing such as filtering or windowing. As is known in waveform models of the art, when a waveform is excited in a borehole by a dipole source, a non-dispersive "direct" shear arrival is present having a constant phase slowness equal to the shear slowness. These models indicate that the amplitude levels associated with the "direct" shear are more than 20 dB below the peak excitation of the flexural mode and can safely be ignored.

The phase slowness for the flexural mode in a circular borehole which traverses a homogeneous, isotropic formation is given by:

$$\alpha(\omega) = M(\omega, S, D, S_P, S_F, \kappa) \quad (1)$$

where $\omega$ is the radian frequency of the wave, S is the shear slowness, D is the diameter of the borehole, $S_F$ is the fluid slowness, $S_P$ is the compressional slowness, and $\kappa$ is the formation/fluid density ratio. Since the wave is non-attenuating, $\alpha(\omega)$ is real.

From equation (1), it is seen that flexural mode dispersion curves scale with hole diameter D. That is, $$M(\omega/k, S, kD, S_P, S_F, \kappa) = M(\omega, S, D, S_P, S_F, \kappa) \quad (2)$$

for any positive real factor k. This is because D is the only length parameter in the equation, and an increase in length and time proportionately has no effect on slownesses.

The characteristics of the flexural mode depend significantly on the relative values of the shear slowness S and the fluid slowness $S_F$. Formations where the shear slowness S is greater than the fluid slowness $S_F$ are called "slow" formations, while formations where the shear slowness is less than the fluid slowness are called "fast" formations. In typical slow formations, the shear slowness might be 300 µs/ft, the fluid slowness might be 203 µs/ft, and the compressional slowness might be 158 µs/ft. In typical fast formations, the shear slowness might be 100 µs/ft, the fluid slowness might be 203 µs/ft, and the compressional slowness might be 53 µs/ft. In both slow and fast formations, the typical formation/fluid density ratio is about 2, and the hole diameter depends on bit size and other drilling factors.

Figure 3A:
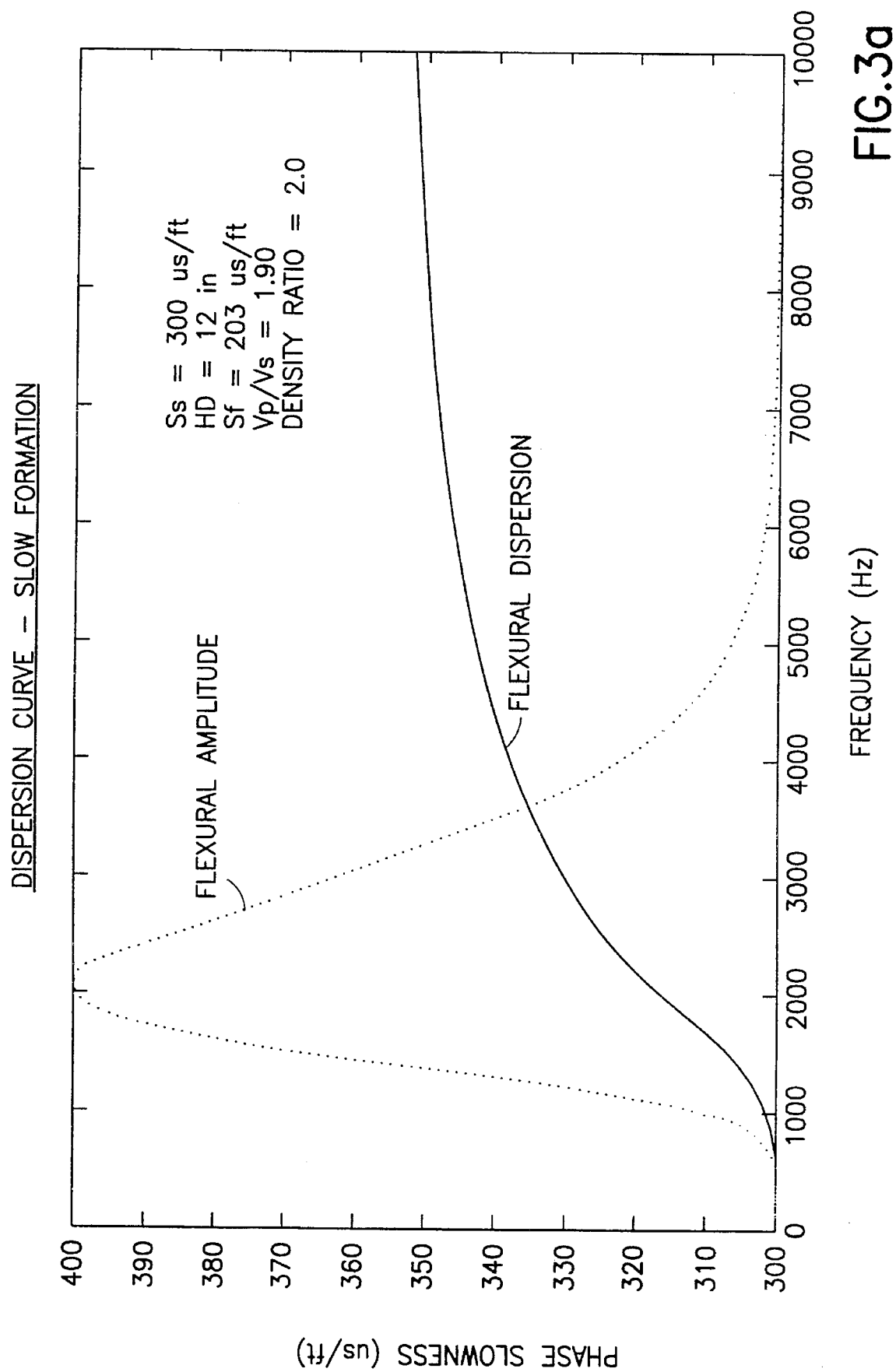
FIG. 3a is a plot of the amplitude and dispersion (phase slowness) of a flexural wave as a function of frequency in a slow formation.
Figure 3B:
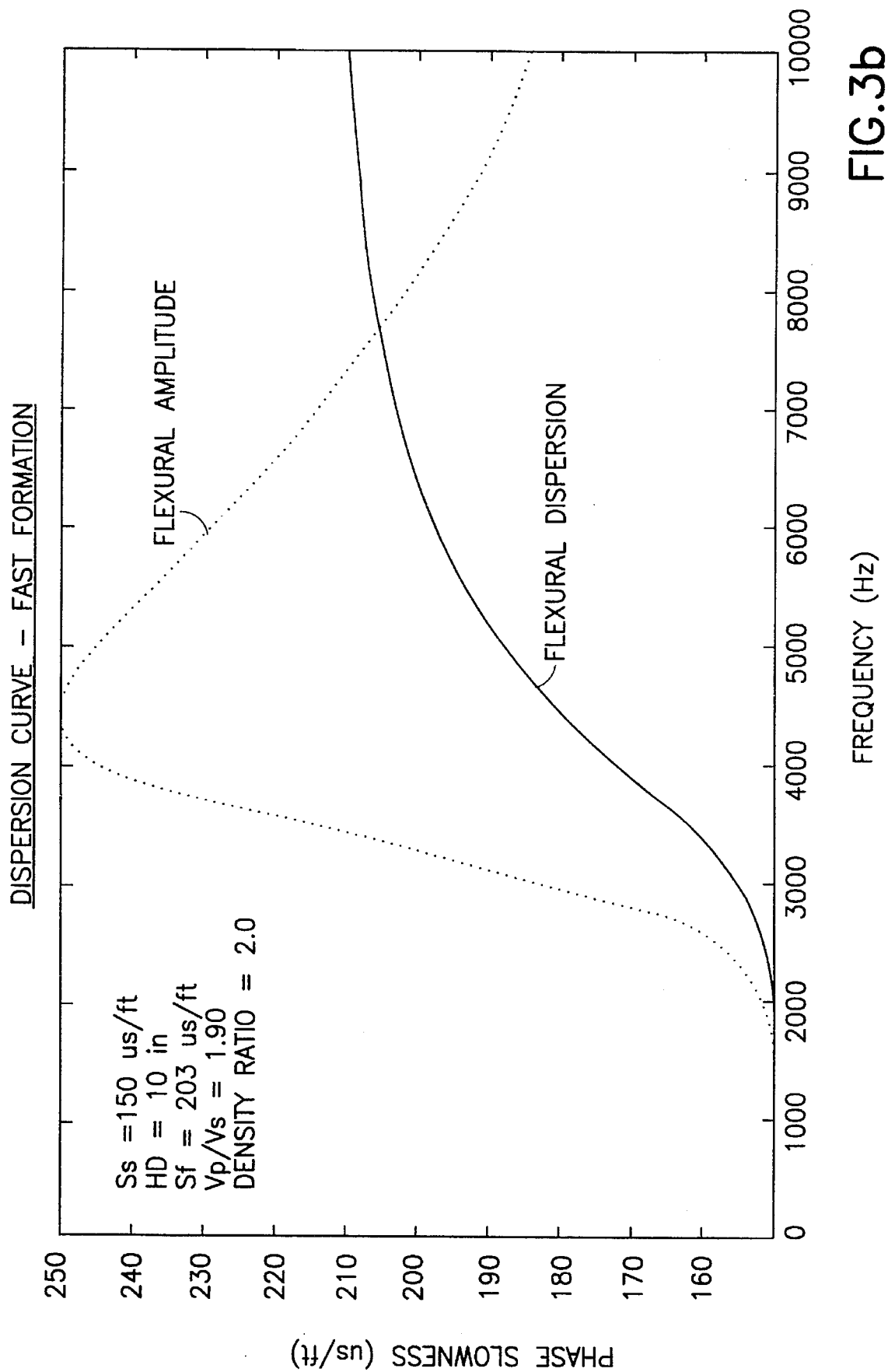
FIG. 3b is a plot of the amplitude and dispersion (phase slowness) of a flexural wave as a function of frequency in a fast formation.

The flexural wave dispersion curve which relates phase slowness to frequency in a slow formation is shown in FIG. 3a as the solid curve. As seen, the propagation is dispersive with the phase slowness ranging from 300 µs/ft at low frequencies to 352 µs/ft at high frequencies. Below 0.8 kHz, however, the wave is essentially non-dispersive, having a nearly constant phase slowness of 300 µs/ft. In FIG. 3b, the flexural wave dispersion curve is seen for a fast formation, with the phase slowness ranging from 100 µs/ft at low frequencies to 200 µs/ft at high frequencies. Below 2.2 kHz, however, the wave is essentially non-dispersive, having a nearly constant phase slowness of 100 µs/ft.

Although the dispersion curves describe how the wave propagates at each frequency, they do not describe how well the wave is excited at each frequency. The signal amplitude is considered to be a function of the electrical drive, the transducer voltage to displacement ratio, and the flexural mode excitation function of the borehole. Even if the source (driver) and the transfer voltage to displacement ratio are arranged to provide a constant acoustic output at all frequencies (i.e., is "white"), the propagating flexural mode spectrum will not be a constant due to the flexural excitation function. The dashed lines in FIGS. 3a and 3b depict the modal excitation function on a normalized linear scale for a typical borehole of twelve inches in diameter.

As seen by reference to equation (1) above, both the dispersion curve $\alpha(\omega)$ and the modal excitation function depend on five physical parameters of the borehole and formation. For notational convenience, a four element vector $\Psi$ is defined according to:

$$\Psi = [D\ S_P\ S_F\ \kappa] \quad (3)$$
$$= [\Psi_1\ \Psi_2\ \Psi_3\ \Psi_4] \quad (4)$$

with $\Psi_0 = S$ so that all five parameters can be represented as $\Psi_i$, $i=0, \ldots 4$.

Regardless of the five parameters affecting the dispersion curve, the maximum excitation of a dispersive wave occurs at the Airy phase where the curvature of the dispersion curve changes sign. In FIGS. 3a and 3b this corresponds to 2.1 kHz and 3.4 kHz respectively, although these results scale with frequency as is evident from equation 2. Thus, if the slow formation had a twenty-four inch borehole rather than a twelve inch borehole, the peak of the excitation would be at 1.05 kHz, while if the fast formation had an eight inch borehole rather than a twelve inch borehole, the peak excitation would be at 5.1 kHz. Clearly, the peak of the flexural excitation has a wide frequency range dependent on slowness and hole diameter, and is located in a frequency range where the dispersion is significant. Thus, a tradeoff exists between having low dispersion at "low" frequencies to reduce bias and having high signal levels to improve noise performance. The consequences of this tradeoff relate directly to the optimal processing frequency band.

As set forth above with reference to FIG. 1, when a dipole source is fired in a borehole, the borehole response is measured by an array of m receivers which may be defined to be at positions $\delta_i$, $i=1, \ldots, m$, on the borehole axis. The received signal is assumed to consist of the flexural mode with other components having been removed by filtering or windowing. At each frequency, the signal spectrum at the m receivers can be represented by a m×1 vector of complex numbers:

$$\begin{bmatrix} S_1 \\ S_2 \\ \cdot \\ \cdot \\ \cdot \\ S_m \end{bmatrix}_\omega = \begin{bmatrix} e^{j\omega\delta_1\alpha(\omega)} \\ e^{j\omega\delta_2\alpha(\omega)} \\ \cdot \\ \cdot \\ \cdot \\ e^{j\omega\delta_m\alpha(\omega)} \end{bmatrix} \quad (5)$$

such that $s(\omega) = P(\omega, S) A(\omega)$ (6)

where $\alpha(\omega)$ is the phase slowness given by:

$$\alpha(\omega) = M(\omega, S, \Psi) \quad (7)$$

where $\Psi$ are the particular values of the externally provided parameters (set forth in equation (4) above) available to the measurement as discussed in more detail below. The term $A(\omega)$ represents the complex spectrum of the propagating wave. It is the product of the source electrical drive, the transducer voltage to displacement ratio, and the flexural mode excitation discussed above.

The waveform $x(\omega)$ received by the receivers is the sum of the signal $s(\omega)$ plus the noise $n(\omega)$:

$$x(\omega) = s(\omega) + n(\omega) \quad (8)$$

where $n(\omega)$ is assumed to be an m×1 vector of spatially uncorrelated, zero-mean, complex Gaussian variates of known standard deviation $\sigma^2$. The noise is assumed to have a constant noise power spectral density, $N_0 = \sigma^2/2$, which means that the noise variance is a constant (white) with $\omega$.

The object of the flexural wave processing is to provide a determination or estimate of the shear slowness S from the detected data x. In making such a determination, values of environmental parameters are taken from other measurements which do not depend on x. For example, the borehole diameter $\Psi_1 = D$ can be taken from a caliper measurement, the compressional slowness $\Psi_3 = S_P$ can be taken from a monopole acoustic measurement, etc. Practically, these parameters are not known exactly, and errors in their values will clearly effect the determination of the slowness S. In fact, errors in the parameters $\Psi$ can be described as a function of both variance and bias, with the variance and bias changing with frequency. For purposes of simplicity, the following discussion will treat the parameter error as a function of variance only. A more complete discussion including both variance and bias is included in Appendix A hereto.

In light of the above, it should be appreciated that the total error in the shear slowness signal S can be defined by:

$$\epsilon^2 S \geq \epsilon^2 N + \epsilon^2 \Psi \quad (9)$$

where $\epsilon^2 N$ is the error due to noise, and $\epsilon^2 \Psi$ is the error due to parameter variance. The parameter error is defined by:

$$\epsilon^2 \Psi = \sum_{i=1}^{4} \beta_i^2 \text{Var}\{\Psi_i\} \quad (10)$$

where $\beta_i$ are signed quantities dependent on the frequency band B/ The noise error, which is bounded below by the Cramer-Rao bound, is defined by Kelly and Levin, "Signal Parameter Estimation for Seismometer Arrays", *Lincoln Lab, M.I.T. Technical Report #339*, (Jan. 8, 1964) according to:

$$\epsilon^2 N = [m\ \text{Var}\{\delta\}\ f^2\ (2E/N_0)]^{-1} \quad (11)$$

where $2E/N_0$ is the matched filter S/N ratio, m is the number of receivers, Var$\{\delta\}$ is the variance of the receiver positions about the mean receiver position, and $f^2$ is the weighted squared frequency or effective center frequency of the flexural wave. In turn, $f^2$ is defined by:

$$f^2 = \frac{1}{E} \int_B \omega^2 |A(\omega)|^2 \left( \frac{\partial \alpha(\omega)}{\partial S} \right)^2 d\omega \quad (12)$$

where E is the total signal energy and defined by:

$$E = \int_B |A(\omega)|^2 d\omega \tag{13}$$

From equation (11), it will be appreciated that the noise error can be reduced by increasing the number m of receivers, by increasing the receiver spacing (so as to increase the variance about the mean receiver position), and by increasing the matched filter S/N ratio. In addition, it should be noted that $\epsilon^2 N$ and $\epsilon^2 \Psi$ both depend on the frequency band B because $\beta_i$, $f^2$, and E each depend on the frequency band.

In order to reduce the total error in the determination of the shear slowness, it is desirable to minimize the error set forth in equation (9). Many approaches exist for applying equations (9) through (13) to selecting the best frequency band for shear slowness measurement and processing. For simplicity, this analysis is limited to processing of 1 kHz wide bands defined in terms of their center frequencies, although the analysis could easily be performed for other bandwidths. For further simplicity, the flexural mode amplitude spectrum $|A(\omega)|^2$ is taken as the flexural mode excitation function for the formation under study which suggests an acoustic output of the dipole source which is constant over the frequency band of interest. Of course, other sources and transmitter transfer voltage to displacement ratios could be included if desired.

The quantities $\beta_i$ have an important role in the total error as they are dependent on both the specific formation characteristics as well as on the processing center frequency. The quantities $\beta_i$ which are defined by:

$$\beta_i = \frac{1}{f^2} \int_B \omega^2 |A(\omega)|^2 \frac{\partial \alpha(\omega)}{\partial S} \frac{\partial \alpha(\omega)}{\partial \psi_i} d\omega \tag{14}$$

can be conveniently normalized to give the dimensionless shear slowness sensitivities $C_i$ according to $$C_i = (\Psi_i/S)\beta_i \tag{15}$$

for i=0, . . . , 4. When $C_i$=1, a change of x% in a parameter causes an x% change in the measured shear slowness. Smaller values of $C_i$ indicate less sensitivity of the measured shear slowness to the i-th parameter.

Figure 4A:
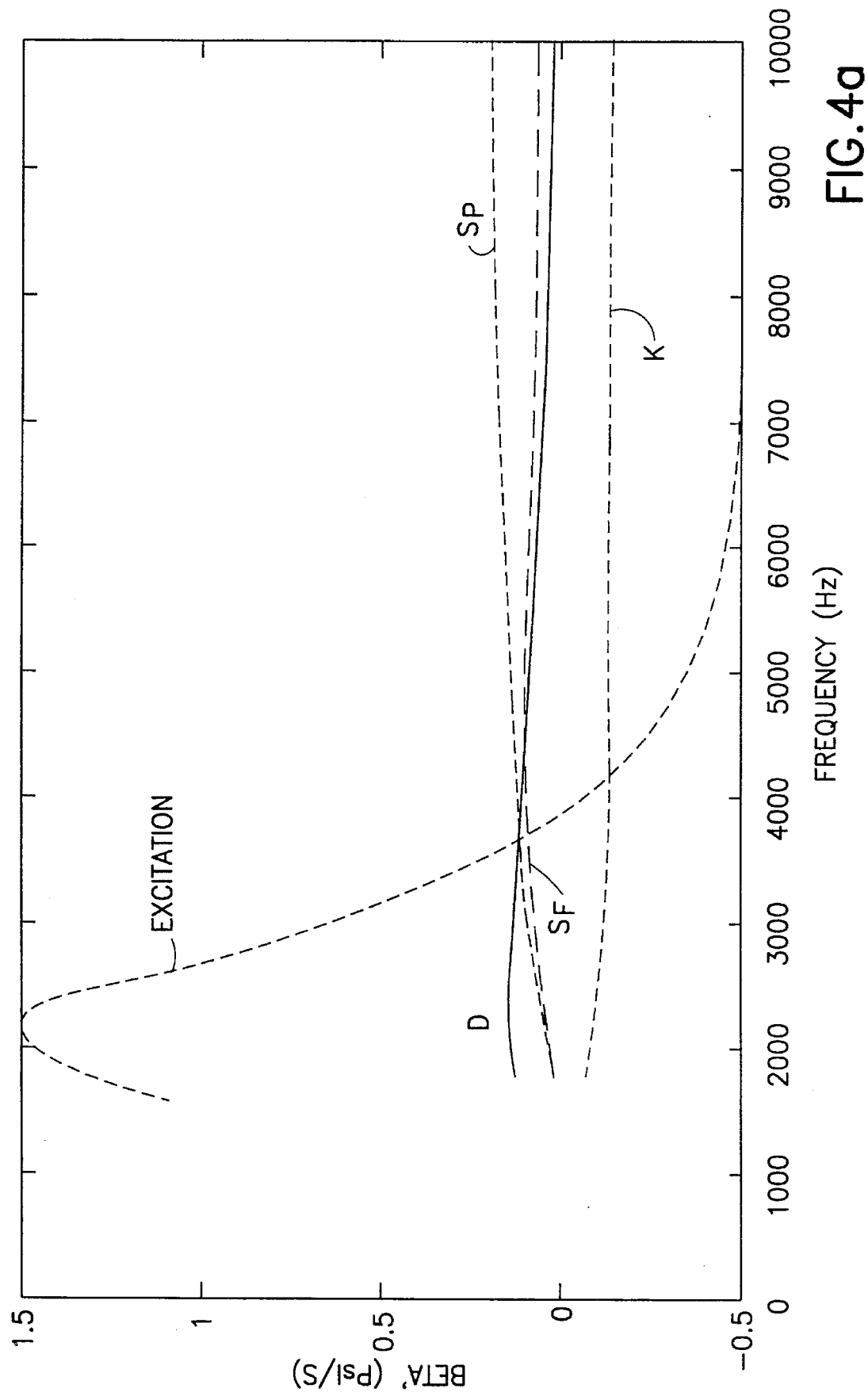
FIG. 4a is a plot of the shear slowness sensitivities of different formation and borehole parameters for a slow formation as a function of frequency.
Figure 4B:
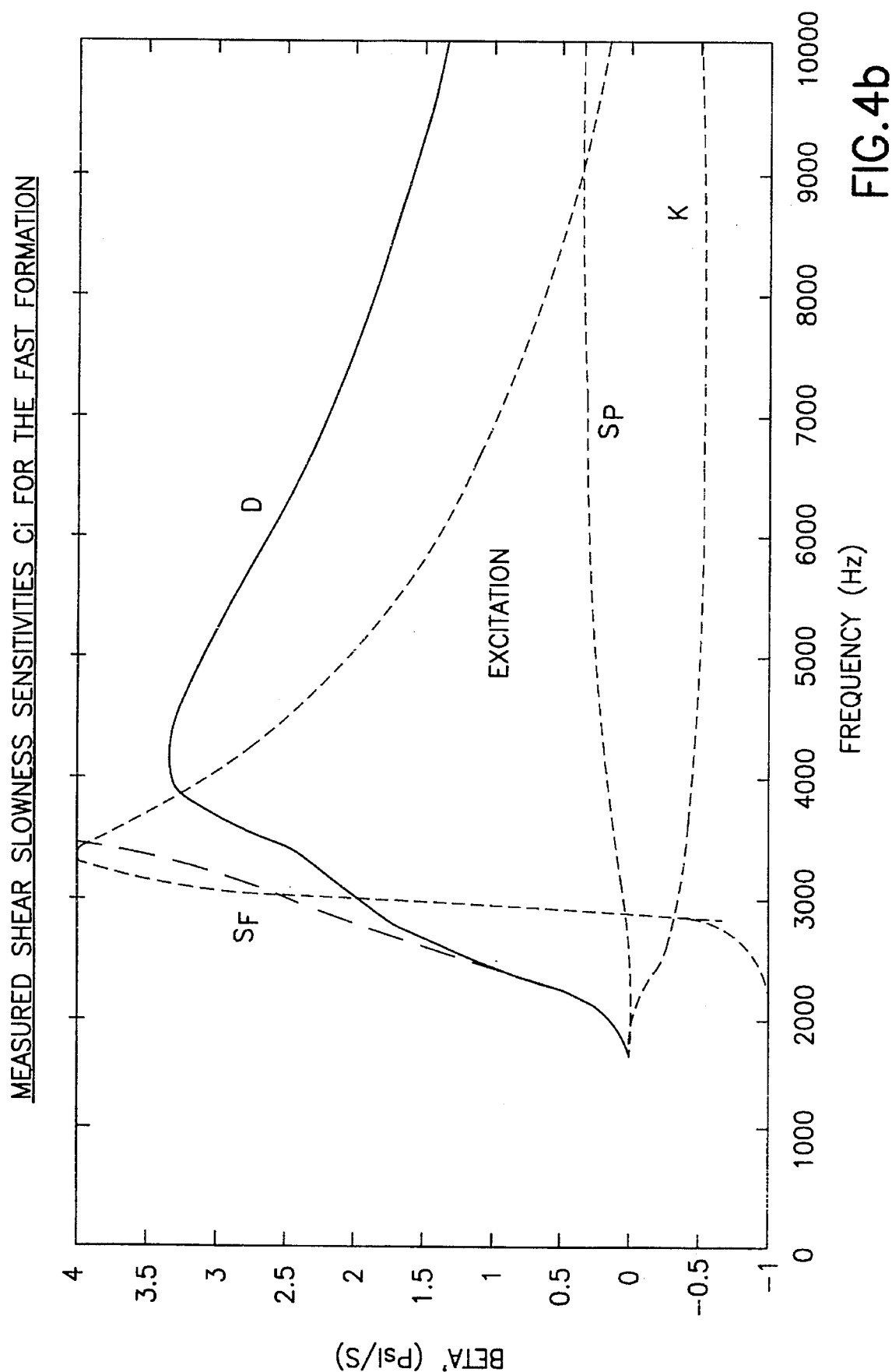
FIG. 4b is a plot of the shear slowness sensitivities of different formation and borehole parameters for a fast formation as a function of frequency.
Figure 5B:
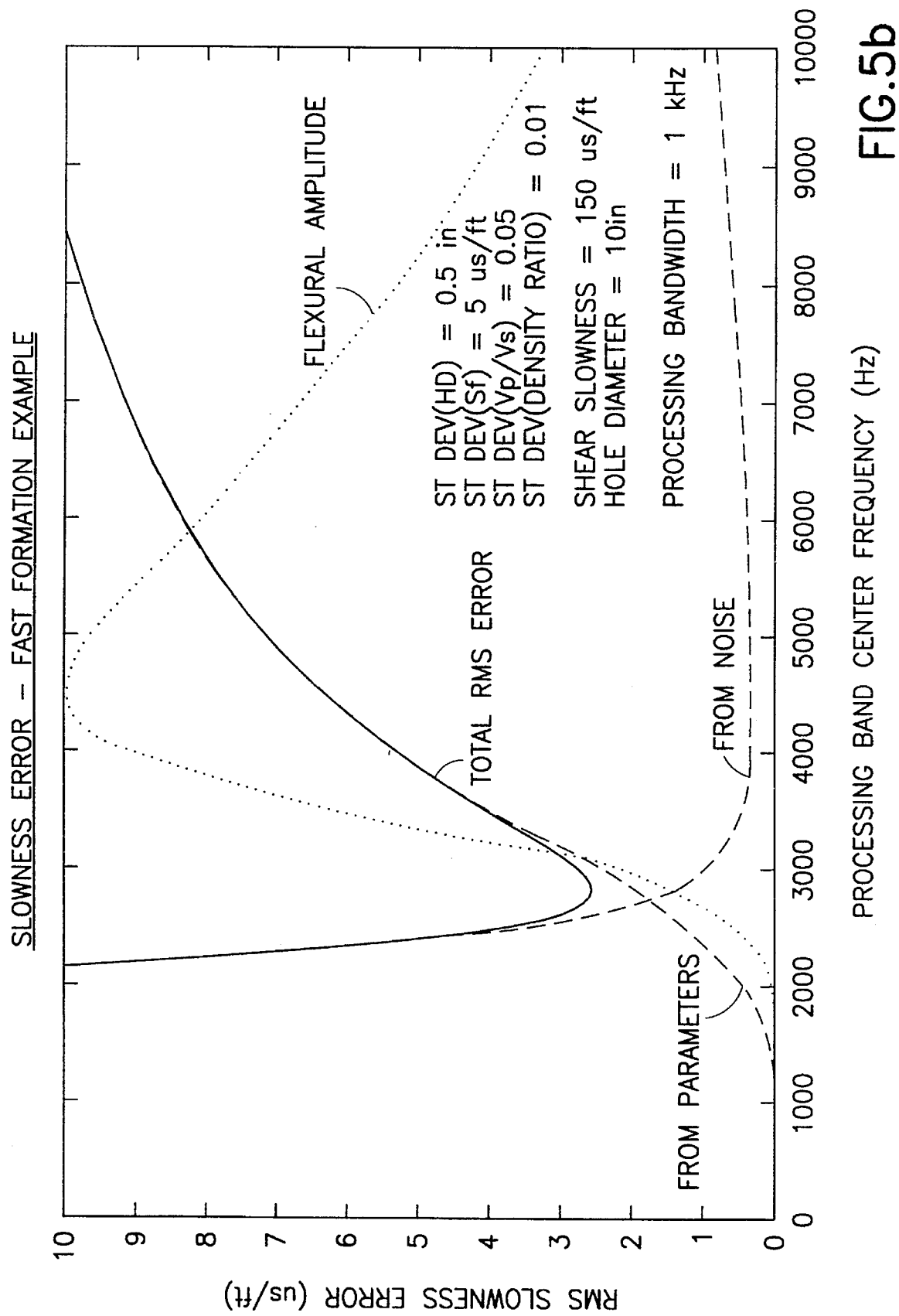
FIG. 5b is a plot of parameter error, noise error, and total error in the processing of flexural wave information as a function of slowness error and processing band center frequency in a fast formation.

FIGS. 4a and 4b depict the shear slowness sensitivities of the different parameters for slow and fast formations respectively (the sum of the parameter errors being shown as a function of the processing band center frequency in FIGS. 5a and 5b). The flexural excitation function is shown by a dotted line in both Figures for reference purposes. With reference to the slow formation of FIG. 4a, the shear slowness sensitivities of all parameters in $\Psi$ are about 0.1. Thus, in slow formations, a ten percent error in an environmental parameter causes only a one percent error in the measured shear slowness. Thus, in slow formations, the shear slowness measurement is only slightly dependent on errors in the environmental parameters. On the other hand, for the fast formation of FIG. 4b, the sensitivity of the shear slowness to both the borehole diameter D and the fluid slowness $S_F$ is very large, and reaches values greater than three near the peak of the flexural excitation. The sensitivity of the shear slowness measurement to the compressional slowness $S_P$ and the formation/fluid density ratio $\kappa$ is also greater than in the slow formation, but not nearly as large as the sensitivity to D and $S_F$. Thus, either excellent measurements of environmental parameters or operation at low frequencies is required to obtain good shear slowness measurements in fast formations.

As is apparent from equations (9)–(12), the shear slowness total error depends both on the assumed errors on the $\Psi$ parameters and the signal to noise ratio $2E/N_0$. The signal to noise ratio is also dependent on the frequency band because of the signal energy $E(\omega)$ as set forth in equation (13) above. Thus, it will be appreciated that the noise error contribution to RMS slowness error which is set forth in equations (11)–(13) can be plotted as a function of frequency in slow and fast formations.

Using the following standard deviations for the parameters $\Psi$

| Parameter: | $\Psi_1$ | $\Psi_2$ | $\Psi_3$ | $\Psi_4$ |
|---|---|---|---|---|
| Standard deviation: | .5 in | 5 µs/ft | .05 $S_F$ µs/ft | .01 | and setting $2E/N_0$=22 dB, the hole diameter=12 inches, the shear slowness=300 µs/ft, and the processing bandwidth=1 kHz, plots of the parameter error, noise error, and total RMS error ($\epsilon_S$1) are seen in FIG. 5a for a slow formation. The minimum total error in the slow formation is seen to occur in a processing band having a center frequency of between approximately 2.0 and 2.8 kHz which includes the frequency (2.1 kHz) of the peak of the flexural wave. Indeed, as can be seen from FIG. 5a, the total error at all frequencies is substantially dominated by noise error as opposed to parameter error, and only around the flexural amplitude peak does the noise error decrease sufficiently that the parameter error contributes significantly to the total. On the other hand, using the same standard deviation of parameters, and setting $2E/N_0$=48 dB, the hole diameter=10 inches, and the shear slowness=150 µs/ft, the minimum total error in the fast formation as shown in FIG. 5b occurs with a processing band center frequency of approximately 2.8 kHz which is significantly below the peak excitation frequency of approximately 4.5 kHz. In FIG. 5b, it is seen that the total error is dominated by the noise error at frequencies below 2.5 kHz, and by the parameter error at frequencies above 3 kHz. Thus, it will be appreciated that in order to process with minimum total error in fast formations, the processing band location must be chosen very carefully, as small frequency changes from the optimum band location can increase error substantially.

In all formations, a dimensionless general frequency $\eta$ which indicates the number of shear slowness wavelengths $\lambda$ in the hole diameter D can be defined and found, where $$\eta = S\,D\,f = D/\lambda \tag{16}$$

where f is frequency. Using the dispersion curves of FIGS. 3a and 3b, and the hole diameters and shear slownesses of the slow and fast formations the curves relate to, it can be determined that the peak of B occurs at approximately $\eta$=0.6 for both the peak frequency of 2.1 kHz for the slow formation, and the peak frequency of 4.5 kHz for the fast formation. This result is approximately valid for all formations as it includes the exact scaling of equation (2). Thus, for any formation in which the shear slowness and hole diameter are known, one can estimate the frequency peak $f_{peak}$ by:

$$f_{peak} = \eta_{peak}/SD = 0.6/SD \tag{17}$$

An optimum generalized frequency $\eta_{opt}$ can also be found for slow and fast formations as a function of shear slowness. If $f_{opt}$ is the optimum center frequency according to the previous minimization of the total error described above, then $$\eta_{opt} = SDf_{opt} \quad (18)$$

Given S and D, if $\eta_{opt}$ is known, $f_{opt}$ can be found from the above. For slow formations, $\eta_{opt}$ has been found to be approximately equal to 0.6, while in fast formations, $\eta_{opt}$ has been found to be approximately equal to 0.2. Typically, the optimum generalized frequency will range between 0.2 and 0.6 depending upon the type of formation.

For the slow formation example given above with respect to FIG. 5a, where the hole diameter was twelve inches, the shear slowness was 300 μs/ft, and the optimal frequency of processing was at approximately 2 kHz, the optimum general frequency $\eta_{opt}$=0.6 as expected. Because, in slow formations, and as seen in FIG. 5a, the processing band of minimum error occurs essentially at the peak amplitude of excitation (i.e., $\eta_{peak}$=0.6), the central frequency of the optimal processing band of the flexural wave can be chosen to be equal to f=0.6/SD without first analyzing the different parameter errors, noise error, etc.

For the example given above with respect to FIG. 5b, where the hole diameter was ten inches, the shear slowness was 150 μs/ft (which is not an extremely "fast" formation), and the optimal central frequency of processing was determined to be at approximately 2.7 kHz, the optimum general frequency $\eta_{opt}$=0.34. In very fast formations, (e.g., shear slowness of 100 μsec/ft), the optimum general frequency can usually be taken to equal 0.2. Thus, as a rule of thumb, the processing band of minimum error occurs substantially below the peak amplitude of the dispersion curve (i.e., see FIG. 5b) as will be appreciated by recognition that the optimum general frequency is lower than the peak general frequency ($\eta_{opt}$ is less than $\eta_{peak}$). In fast formations, as a rule of thumb, flexural wave processing can be accomplished in a processing band centered at frequency f=0.2/SD without first analyzing the different parameter errors, noise error, etc.

For formations which are neither fast nor slow, a look-up table of optimum general frequencies can be provided so that the central frequency of the optimal processing band can be determined from the optimum general frequency, the borehole diameter, and the estimated shear slowness. Rather than construct a two-dimensional table of $f_{opt}$ as a function of S and D, $\eta_{opt}$ can be described as a one dimensional smooth function of S, from which $f_{opt}$ can be calculated given the shear slowness estimate S and the borehole diameter estimate D. A preferred smooth function is:

$$\eta_{opt}(S) = .2 + .4 \left( \frac{2}{\pi} \right) \arctan\left( \frac{S - 100}{100} \right) \quad (19)$$

In a very fast formation where S~100 μs/ft, equation (19) reduces to $\eta_{opt}$=0.2, while in slow formations where S>>300 μs/ft, equation (19) reduces to $\eta_{opt}$=0.6.

Figure 6:
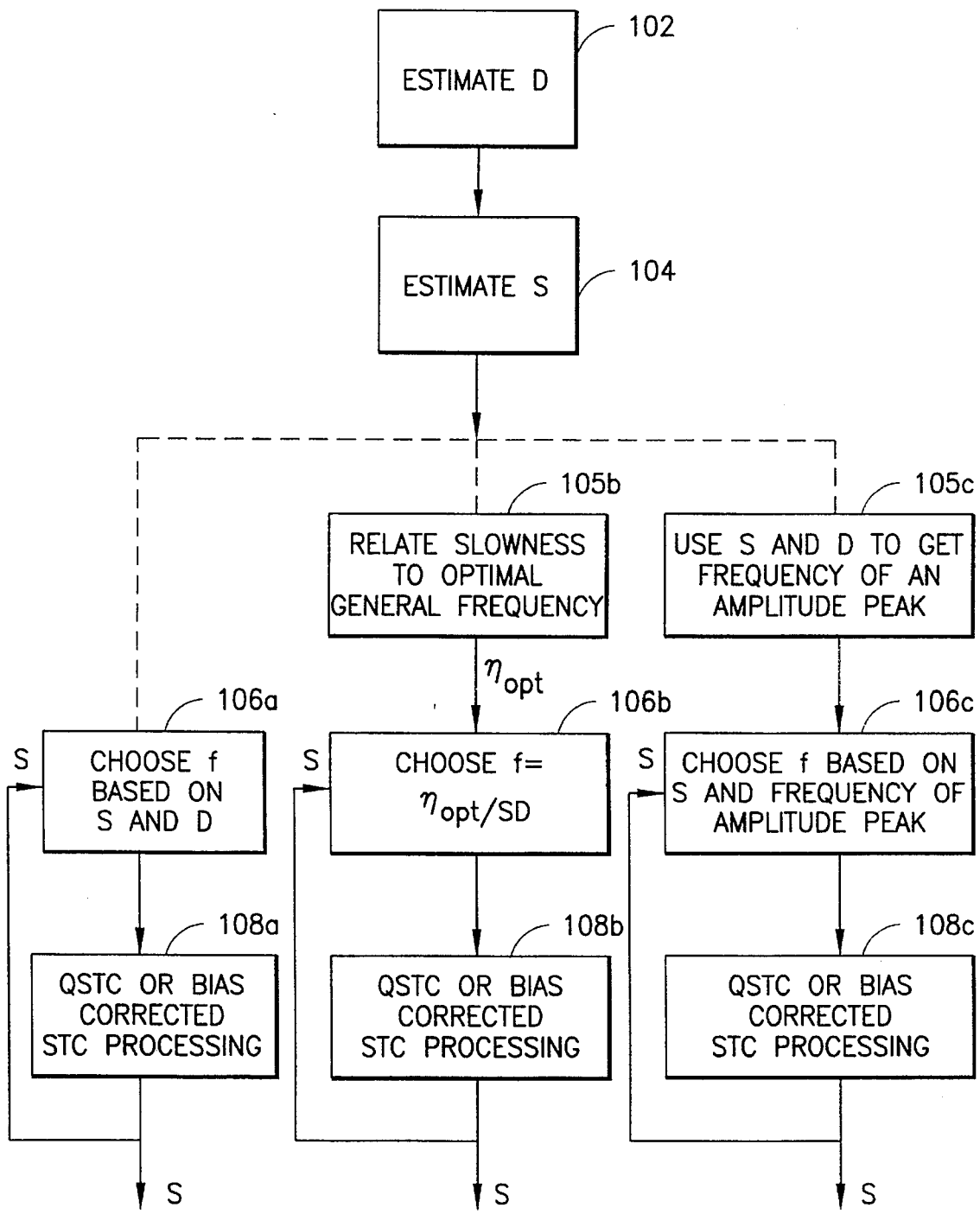
FIG. 6 is a block diagram of the processing accomplished by the processing means of FIG. 1 in accord with a first embodiment of the invention.

Turning now to FIG. 6, a flow chart of several first alternative preferred methods for finding a center frequency of a frequency band for processing flexural waves is seen. At 102, an estimate of the borehole diameter D is obtained, either using a calipers, or from previous information regarding the borehole. At 104, an estimate of the shear slowness S of the formation is obtained, preferably via STC, bias-corrected STC, or QSTC processing of the flexural wave data obtained by the sonic detectors of the borehole tool. According to a first alternative method, at 106a, a center frequency f for a processing band is chosen to be f=0.2/SD if the formation is a fast formation, and to be f=0.6/SD if the formation is a slow formation. The first alternative method continues at 108a where the processing band chosen at 106a is used in the bias-corrected STC or QSTC processing technique so that a new determination of shear slowness is made. If desired, the new determination of shear slowness can then fed back in an iterative manner to step 106a as the value "S", so that a new processing band is chosen. The method can continue iteratively through steps 106a and 108a with the center frequency being refined until the refinement is considered de minimus, at which point the final determination of shear slowness is obtained. Alternatively, the determination of shear slowness at one depth of interest in the formation (i.e., a previous depth) can be used as the estimate of S at a next depth of interest at which new flexural wave data is obtained and processed.

In a second alternative method, at 105b a look-up chart or an equation such as equation (19) is used to relate a shear slowness estimate to an optimum general frequency $\eta_{opt}$, which is typically between 0.2 and 0.6. Then, at 106b, using the optimum general frequency, and the shear slowness and borehole diameter estimates S and D, the center frequency of the processing band is chosen to be $f_{opt}=\eta_{opt}/SD$. It should be appreciated that steps 105b and 106b could be combined if desired by utilizing a two-dimensional table of $f_{opt}$ or a more complex equation or set of equations for all shear slowness estimates S and borehole diameter estimates D. Regardless, the second alternative method continues at 108b where the processing band chosen at 106b is used in the bias-corrected STC or QSTC processing technique so that a new determination of shear slowness is made. If desired, the new determination of shear slowness may then be fed back to step 106b and iteratively cycled, or the new determination may be used as the shear slowness estimate for the next flexural wave data.

In a third alternative method, at 105c, an indication of the frequency of an amplitude peak of the flexural waves propagating in the formation is obtained either by measurement in the borehole, or based on an estimate of the formation slowness S, the borehole diameter D, and general frequency η which is preferably set to 0.6, where the frequency peak=η/SD. Then at 106c, based on the formation slowness S, and the value of the frequency peak the center frequency of the processing band is chosen to be in a frequency band around the peak for a slow formation, and in a frequency band substantially below the peak for a fast formation. The third alternative method continues at 108c where the processing band chosen at 108c is used in the bias-corrected STC or QSTC processing technique so that a new determination of shear slowness is made. If desired, the new determination of shear slowness may then be fed back to step 106c and iteratively cycled through steps 106b and 108b, or the new determination may be used as the shear slowness estimate for the next flexural wave data.

Figure 7:
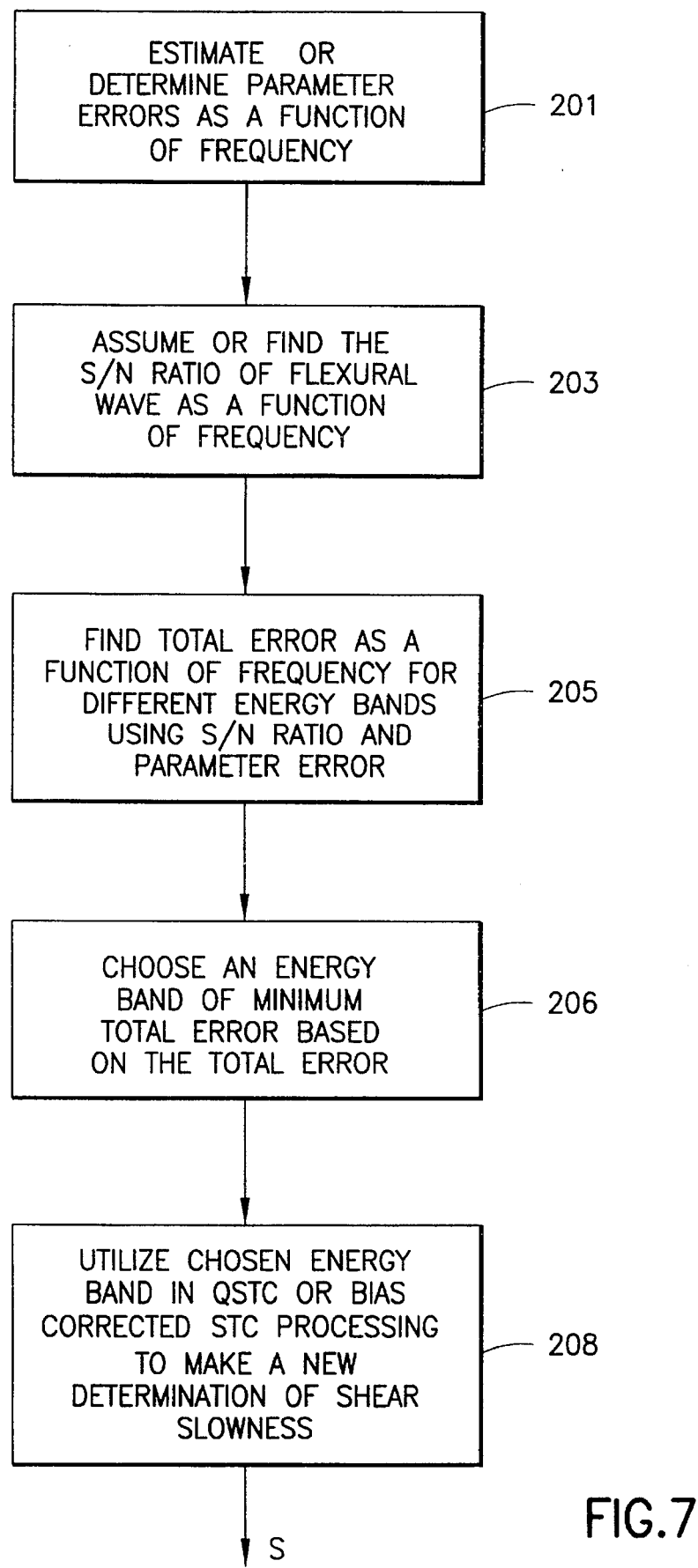
FIG. 7 is a block diagram of the processing accomplished by the processing means of FIG. 1 in accord with a second embodiment of the invention.

Turning now to FIG. 7, yet another alternative method of finding an optimal processing band is seen. As seen in FIG. 7, at step 201 the error of a plurality of formation and/or borehole parameters such as borehole diameter error, fluid slowness error, and if desired, compressional slowness error, and formation/fluid density ratio error as a function of frequency are estimated or determined. Typically, the borehole diameter error is either assumed or determined using calipers, while the fluid slowness error is assumed. The compressional slowness error is either assumed or determined using a sonic type borehole tool, while the formation/fluid density ratio error is assumed utilizing nuclear-type borehole tools and samples of the borehole fluid. Then, at 203, the S/N ratio of the flexural wave signal as a function of frequency is assumed or found. Using the S/N ratio, and the parameter error, at 205, the total error as a function of frequency is found for different frequency bands, and at 206, based on the total error, an frequency band of minimum total error is chosen in which to process the flexural wave data. The frequency band is then utilized at 208 in the bias-corrected STC or QSTC processing technique so that a new determination of shear slowness is made. The new determination of shear slowness can be taken as the determined shear slowness for the formation at the depth of interest. Alternatively, the new determination of shear slowness may be used as the "estimated" shear slowness input to the methods described above with reference to FIG. 6.

Regardless of the specific manner of finding the frequency band in which the flexural wave information is to be processed, it should be appreciated that the frequency band which is chosen will affect the QSTC or bias-corrected STC processing carried out at steps 108a, 108b, 108c, or 208 of FIGS. 6 and 7. In particular, in both bias-corrected STC and QSTC processing, the filter used in the Fourier transform is defined by the frequency band; i.e., lower and upper frequencies are defined, as well as the bandwidth. Thus, the determination of the center frequency helps define the filter parameters used in processing. In addition, in accord with a preferred aspect of the invention, the width of the frequency band used in the Fourier transform, instead of being a uniform 1 kHz in width, is preferably normalized by scaling the bandwidth of the frequency band to a specified fraction of the center frequency $f_c$; i.e., $BW=f_c/Q$, so that although the center frequency might change due to formation slowness or hole diameter, the shape of the signals processed will be the same for all values of $f_c$. The impulse response of such a "constant Q" filter has the same shape for all center frequencies, as the waveform scales in time with the center frequency. Thus, for example, if a formation having a shear slowness of 300 μs/ft were traversed by both twelve inch and twenty-four inch boreholes, the center frequencies of the preferred processing bands would be located at 2.1 and 1.05 kHz respectively. If the bandwidth of processing were to be fixed to 1 kHz, the Q of the response in the twelve inch borehole would be approximately equal to one, while the Q of the response in the twenty-four inch borehole would be approximately equal to two. Hence, the waveform for the twelve inch borehole would be narrower band and more "ringy" than the waveform for the twenty-four inch borehole. On the other hand, if the bandwidth is normalized as preferred in order to keep Q equal to one, then the twenty-four inch borehole would be provided with a bandwidth of 0.5 kHz, and the wave shapes would be equal as desired.

Similarly, in accord with a preferred aspect of the invention, the window length $T_w$ used in STC, bias-corrected STC, and QSTC processing is normalized to scale with the center frequency $f_c$ so that the processing window contains the same number of cycles (n) regardless of the frequency of the center frequency. In particular, the window length $T_w$ is made to scale with $f_c$ by setting the window length $T_w$ equal to $n/f_c$. Thus, once a determination is made as to the number of cycles that are desired, and the center frequency of the processing band is chosen, the time length of window $T_w$ can be normalized. For the example of the twelve inch and twenty-four inch boreholes used above, if the window length were fixed at 1.5 milliseconds, then three cycles of 0.5 milliseconds each would be in the processing window for the waveform of the twelve inch borehole, while only one and a half cycles would be in the waveform of the twenty-four inch borehole. By normalizing, the window length is changed for the different circumstances. Thus, if n is chosen to be equal to three, such that three cycles are to be included in each window, the window length of the processing window for the twelve inch borehole would be kept at 1.5 milliseconds, while the processing window for the twelve inch borehole would increase to 3 milliseconds. Thus, parameter normalization with $f_c$ keeps the waveshapes the same and the contents of the processing window the same for all frequencies.

It will be appreciated by those skilled in the art that the window length $T_w$ is utilized in QSTC processing where the data is windowed prior to the Fourier transformation, whereas in STC and bias-corrected STC, the windowing is utilized prior to stacking.

There have been illustrated and described herein methods of determining an optimal frequency band for the processing of flexural wave borehole information. While particular embodiments of the invention have been described, it is not intended that the invention be limited exactly thereto, as it is intended that the invention be as broad in scope as the art will permit. Thus, while the invention has been described primarily with respect to the method of the invention, those skilled in the art will appreciate that the apparatus invention relates directly to the method invention. Also, while particular values for variables such as the generalized frequency were disclosed, it will be appreciated that other values could be utilized. For example, if the electrical drive and transducer voltage to displacement ratio are other than white, the rule of thumb values of 0.2 for fast formations and 0.6 for slow formations, and the smooth function would be modified accordingly. Further, while the invention was described with reference to a preferred 1 kHz bandwidth, or a bandwidth which is normalized relative to a 1 kHz bandwidth, it will be appreciated that bands of other width could be utilized. In fact, if desired, the methods of the invention could be utilized to maximize for an ideal bandwidth which could then be normalized as discussed above. Furthermore, it will be appreciated that the invention was described with reference to a model which has certain underlying assumptions. However, the invention can still be utilized with different models which might change the equations provided, but which do not change the underlying concepts taught herein. Therefore, it will be apparent to those skilled in the art that other changes and modifications may be made to the invention as described in the specification without departing from the spirit and scope of the invention as so claimed.

APPENDIX A

The errors in the Ψ parameters are described by their biases and variances. Let $\Psi_i^0$ be the true value of the parameter $\Psi_i$, then the bias vector $\mu_\Psi$ is a 4×1 vector having elements $$\{\mu_\Psi\}_i = E[\Psi_i] - \Psi_i^0 \quad (A5)$$
$$= \mu_i \quad (A2)$$

The expectation is taken over the random process on the Ψ parameters. The errors on the Ψ parameters will be assumed to be uncorrelated, although this assumption isn't required by the theory. Then the covariance matrix for the Ψ parameters is a diagonal 4×4 matrix $$\{Cov[\Psi]\}_{ij} = Var\{\Psi_i\} \quad \text{if } i=j \quad (A3)$$
$$= 0 \quad \text{otherwise.} \quad (A4)$$

The total error includes both covariance and bias terms $$\epsilon_\Psi^2 = \text{Cov}[\Psi] + \mu_\Psi \mu_\Psi^T \tag{A5}$$

This is a 4×4 matrix characterizing the total error on the $\Psi$ parameters. $\epsilon_\Psi^2$ is assumed to be known.

Bound on the total error
LMSE/ML estimator
The test statistic for the LMSE/ML estimator assuming the environmental parameters are known correctly is given by: (For the present case, the matrix R is 1.)

$$T(S) = \frac{1}{2\sigma^2} \int_B x^T(\omega) P(\omega,S) P^T(\omega,S) x(\omega) d\omega \tag{A6}$$

Here the superscript T indicates complex transpose of a matrix. The estimated shear slowness is the value of S which maximizes T(S).

The product $P^T(\omega, S)x(\omega)$ can be recognized as the dispersive beamformer output at frequency $\omega$ and shear slowness S.

$$B(\omega,S) = P^T(\omega,S)x(\omega) \tag{A7}$$

$$= \sum_{i=1}^{m} \{x(\omega)\}_i e^{-j\omega\delta_m \alpha(\omega)} \tag{A8}$$

$B(\omega,S)$ is a complex number representing the the stacked spectral value of the waves backpropagated to the first receiver using the dispersion curve $\alpha(\omega)$. Then $$T(S) = \frac{1}{2\sigma^2} \int_B |B(\omega,S)|^2 d\omega \tag{A9}$$

That is, T(S) is proportional to the stacked, dispersively backpropagated energy. By dropping the constant factor $1/2\sigma^2$ and normalizing by the total signal energy, T(S) can be shown to be proportional to the dispersive semblance.

Total error matrix
The lower bound on the total error for the slowness estimate is a scalar $$\epsilon_S^2 = E[(S - S^0)^2] \tag{A10}$$

$$\geq J_S^{-1} + B_{S\Psi} \epsilon_\Psi^2 B_{S\Psi}^T \tag{A11}$$

Here $S^0$ is the true slowness value and the expectation is taken over both the noise and environmental parameter random processes. $J_S$ is a real scalar corresponding to the Fisher information matrix for S and $B_{S\Psi}$ is the 1×4 sensitivity matrix of S to the $\Psi$ parameters. Equation 25 is a realistic bound if the signal-to-noise ratio is high and the errors in the $\Psi$ parameters are small. The following will assist the reader in the derivation from Since the inversion is for a single parameter and the flexural mode is non-attenuating $$H_S^T(\omega) H_S(\omega) = \left( \frac{\partial \alpha(\omega)}{\partial S} \right)^2 \tag{A12}$$

is a real scalar. The Fisher information matrix is a real scalar $$J_S = \frac{m \text{Var}\{\delta\}}{\sigma^2} \int_B \omega^2 |a(\omega)|^2 \left( \frac{\partial \alpha(\omega)}{\partial S} \right)^2 d\omega \tag{A13}$$

where $$M\{\delta\} = \frac{1}{m} \sum_{i=1}^{m} \delta_i \tag{A14}$$

$$\text{Var}\{\delta\} = \frac{1}{m} \sum_{i=1}^{m} (\delta_i - M\{\delta\})^2 \tag{A15}$$

Var{$\delta$} is the mean-squared array length, which is a constant for a particular tool. For a uniformly-spaced array of 8 receivers separated by 6 inches, Var{$\delta$}=1.31 ft.

The expression for $J_S$ can be conveniently simplified. The total signal energy is given by $$E = \int_B |a(\omega)|^2 d\omega \tag{A16}$$

Define the weighted squared frequency as $$\bar{f}^2 = \frac{1}{E} \int_B \omega^2 |a(\omega)|^2 \left( \frac{\partial \alpha(\omega)}{\partial S} \right)^2 d\omega. \tag{A17}$$

$\bar{f}$ indicates the effective frequency content of the data for the slowness measurement. Then $$J_S = m \text{Var}\{\delta\} \bar{f}^2 \frac{2E}{N_0} \tag{A18}$$

where $2E/N_0$ is the matched filter signal-to-noise ratio in the band B. $2E/N_0$ can be estimated from the semblance of the data The derivative matrix for the $\Psi$ parameters is a 4×1 vector having elements $$\{H_\Psi\}_i = \frac{\partial \alpha}{\partial \Psi_i} \tag{A19}$$

The sensitivity matrix is given by $$B_{S\Psi} = J_S^{-1} \frac{m \text{Var}\{\delta\}}{\sigma^2} \int_B \omega^2 |a(\omega)|^2 H_\Theta^T(\omega) H_\Psi(\omega) d\omega \tag{A20}$$

$$= \frac{1}{\bar{f}^2} \int_B \omega^2 |a(\omega)|^2 \frac{\partial a(\omega)}{\partial S} H_\Psi(\omega) d\omega \tag{A21}$$

$$= [\beta_1 \, \beta_2 \, \beta_3 \, \beta_4] \tag{A22}$$

where $$\beta_i = \frac{1}{\bar{f}^2} \int_B \omega^2 |a(\omega)|^2 \frac{\partial \alpha(\omega)}{\partial S} \frac{\partial \alpha(\omega)}{\partial \Psi_i} d\omega \tag{A23}$$

for i=1, ..., 4. The values of $\beta_i$ are signed quantities dependent on the band B. The $\beta_i$ depend on the amplitude squared spectrum of the signal, $|\alpha(\omega)|^2$, but not on the noise variance $\sigma^2$.

Equation 25 can then be written $$\epsilon_S^2 \geq \underbrace{\left[ m \text{Var}\{\delta\} \bar{f}^2 \frac{2E}{N_0} \right]^{-1}}_{\text{Noise}} + \underbrace{\sum_{i=1}^{4} \beta_i^2 \text{Var}\{\Psi_i\}}_{\text{Parameter variance}} + \underbrace{\left[ \sum_{i=1}^{4} \beta_i \mu_i \right]^2}_{\text{Parameter bias}} \tag{A24}$$

$$\geq e_N^2 + e_\Psi^2 + e_\mu \tag{A25}$$

where the second and third terms arise from expanding the second term of Equation A11 by Equations A3 and A5. Here $2E/N_0$, $\bar{f}^2$, and the $\beta_i$ are dependent on the frequency band B. Parameter variance $e_\Psi^2$ always increases the error on S.

Equation A24 provides several immediate insights into the shear slowness measurement. First, overall error performance depends on both noise and error on environmental parameters, high $2E/N_0$ waveforms may yield large shear slowness errors if comparable care isn't given to the environmental measurements. Second, a 3 dB (2×) reduction of $2E/N_0$ yields a doubling of the variance due to noise, $e_N^2$. Third, assume that all but one of the environmental parameters is known exactly. Then doubling that parameter's variance will double the variance due to parameters, $e_\Psi^2$.

We claim:

1. A method of determining a frequency band for the frequency-dependent processing of flexural wave information obtained in a borehole traversing a formation, comprising:

a) obtaining a determination of a diameter of the borehole;

b) obtaining a preliminary estimate of a shear slowness of the formation;

c) choosing a frequency band with a center frequency which is a function of said preliminary estimate of a shear slowness of the formation, and a function of the product of said estimate shear slowness and said borehole diameter, said frequency band having a bandwidth less than twice said center frequency; and d) processing the flexural wave information in said frequency band to obtain an indication of a parameter of the formation.

2. A method according to claim 1, wherein:

said indication of a parameter is a determination of the shear slowness of the formation.

3. A method according to claim 1, wherein:

said center frequency ($f_c$) is chosen according to $f_c=g(S)/SD$, where S is said preliminary estimate of shear slowness, D is said diameter of said borehole, and $g(S)$ is said function of said preliminary estimate which is substantially equal to 0.6 for slow formations and substantially equal to 0.2 for fast formations assuming a white electrical drive and transducer voltage to displacement ratio of a borehole tool generating flexural waves in the borehole, and where $g(S)$ is accordingly modified from being substantially equal to 0.6 for slow formations and substantially equal to 0.2 for fast formations assuming an electrical drive and transducer voltage to displacement ratio which is other than white.

4. A method according to claim 1, wherein:

said center frequency ($f_c$) is chosen according to $f_c=g(S)/SD$, where S is said is said preliminary estimate of shear slowness, D is said diameter of said borehole, and $g(S)$ is said function of said preliminary estimate which is a smooth function.

5. A method according to claim 4, wherein:

said smooth function is $0.2+((0.8/\pi)$ arctan $((S-100)/100))$.

6. A method according to claim 2, further comprising:

e) repeating steps a) through d) for a plurality of depths in the borehole, wherein said determination of the shear slowness of the formation at one of said plurality of depths in the borehole is used as said estimate of a shear slowness in step c) at another of said plurality of depths in the borehole.

7. A method according to claim 2, further comprising:

repeating steps c) and d) in an iterative manner by using said determination of the shear slowness of the formation as said estimate of shear slowness in step c).

8. A method according to claim 2, further comprising:

normalizing said bandwidth of said frequency band as a function of said center frequency, wherein said flexural wave information is processed in said normalized frequency band.

9. A method according to claim 2, wherein:

said processing includes choosing a window length, and said window length is normalized as a function of said center frequency.

10. A method according to claim 1, wherein:

said processing includes Fourier transforming at least a portion of said flexural wave information in said frequency band with said center frequency to obtain Fourier transformed signals, backpropagating said Fourier transformed signals to obtain a plurality of sets of backpropagated signals, stacking said backpropagated signals of each set to provide stacked sets, and using said stacked sets to determine said indication of a parameter of the formation.

11. A method of determining a frequency band for the frequency-dependent processing of flexural wave information obtained in a borehole traversing a formation, comprising:

a) determining an indication of a frequency of an amplitude peak of a flexural wave in the borehole;

b) obtaining a preliminary estimate of a shear slowness of the formation; and c) when said preliminary estimate of shear slowness is indicative of a slow formation, processing the flexural wave information in a frequency band with a center frequency substantially equal to said frequency of said amplitude peak to obtain an indication of a parameter of the formation, and when said preliminary estimate of shear slowness is indicative of a fast formation, processing the flexural wave information in a frequency band with a center frequency substantially below said frequency of said amplitude peak to obtain an indication of a parameter of the formation.

12. A method according to claim 11, further comprising:

d) obtaining a determination of a diameter of the borehole, wherein said frequency of an amplitude peak is obtained from said determination of a diameter of the borehole and from said preliminary estimate of a shear slowness of the formation.

13. A method of determining a frequency band for the frequency-dependent processing of flexural wave information obtained in a borehole traversing a formation, comprising:

a) obtaining an indication of error of at least one parameter of the borehole as a function of frequency;

b) obtaining an indication of noise error of a flexural wave signal in the borehole as a function of frequency;

c) finding in a plurality of frequency bands a total error as a function of frequency, said total error being at least as great as said error of a parameter plus said noise error;

d) choosing an frequency band of substantially minimum total error, said frequency band having a center frequency; and e) processing the flexural wave information in said frequency band of substantially minimum total error to obtain an indication of a parameter of the formation.

14. A method according to claim 13, wherein:

said parameter of a formation is a shear slowness of the formation.

15. A method according to claim 14, wherein:

said at least one parameter of a borehole comprises a borehole diameter error.

16. A method according to claim 15, wherein:

said at least one parameter of a borehole further comprises fluid slowness error of fluid in the borehole.

17. A method according to claim 14, further comprising:

normalizing a bandwidth of said frequency band of substantially minimum total error as a function of said center frequency, wherein said flexural wave information is processed in a normalized frequency band of substantially minimum total error.

18. A method according to claim 14, wherein:

said processing includes choosing a window length, and said window length is normalized as a function of said center frequency.

19. Apparatus for determining a characteristic of a formation traversed by a borehole, comprising:

a) sonic source means for generating flexural waves;

b) a plurality of sonic receiver means for detecting said dispersive waves generated by said sonic source means, and for generating signals in response thereto;

c) processor means for obtaining said signals, for choosing as a function of a preliminary estimate of a shear slowness of the formation and as a function of a diameter of said borehole a frequency band of substantially minimum noise in which to process said signals, for Fourier transforming said signals in said frequency band having a center frequency to obtain Fourier transformed signals, for backpropagating said Fourier transformed signals to obtain a plurality of sets of backpropagated signals, for stacking said backpropagated signals of each set to provide stacked sets, and for using said stacked sets to determine said indication of a parameter of the formation.

20. An apparatus according to claim 19, wherein:

said indication of a parameter is a determination of the shear slowness of the formation.

21. A method according to claim 1, wherein:

said frequency band is chosen to limit total error of said parameter upon obtaining an indication of said parameter via said processing.

* * * * *